No. 757,448. PATENTED APR. 19, 1904.
E. FRIESDORF.
APPARATUS FOR SEPARATING OIL AND GREASE FROM WATER.
APPLICATION FILED FEB. 16, 1903.
NO MODEL.

Witnesses.
Th. Mödder
J. Mödder

Inventor.
E. Friesdorf
by J. M. Horschel
his Attorney

No. 757,448. Patented April 19, 1904.

UNITED STATES PATENT OFFICE.

EDUARD FRIESDORF, OF DÜREN, GERMANY.

APPARATUS FOR SEPARATING OIL AND GREASE FROM WATER.

SPECIFICATION forming part of Letters Patent No. 757,448, dated April 19, 1904.

Application filed February 16, 1903. Serial No. 143,717. (No model.)

*To all whom it may concern:*

Be it known that I, EDUARD FRIESDORF, a subject of the German Emperor, residing at Düren, in the Province of the Rhine, Prussia, Germany, have invented a new and useful Apparatus for Separating Oil and Grease from Water, of which the following is a specification.

The object of my invention is to provide a convenient construction of apparatus capable of separating oil and grease from water and completely freeing the oil so recovered from any traces of water.

The apparatus is more particularly designed for use in recovering the oil from the condensation of steam-engines, although its application is also contemplated in other cases where it is desired to separate grease or fats from aqueous liquids containing the same in the form of a mechanical admixture.

My invention is illustrated in the annexed drawings, in which—

Figure 1:
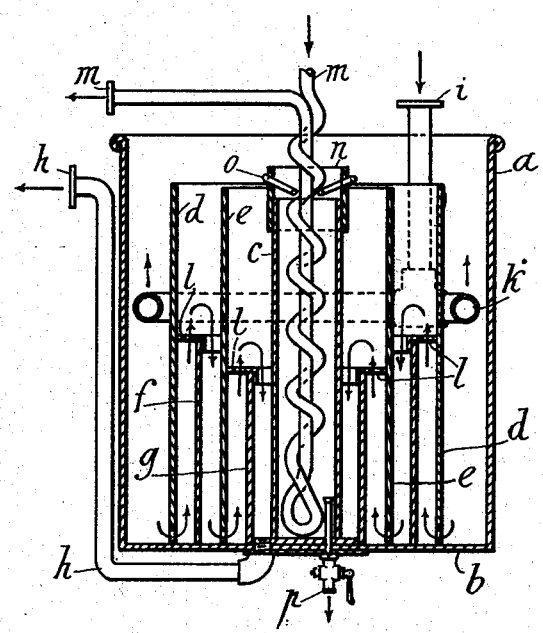
Figure 2:
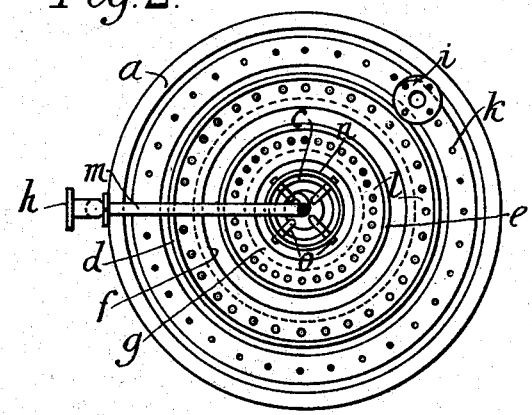

Figure 1 is a vertical central section, and Fig. 2 a plan, of the preferred construction of my apparatus.

It consists of an external upright vessel $a$ of cylindrical form closed by a bottom plate $b$. On the bottom $b$, within the vessel, is seated a concentric tube $c$ of slightly less height than the vessel $a$. Within the annular space existing between said tube and the wall of the vessel $a$ are placed two tubular bodies $d$ $e$, having a number of peripheral holes near their lower ends, their respective diameter being such as to divide said annular space into three zones or compartments of nearly equal widths. The upper edge of the tubular body $e$ projects slightly above that of the central tube $c$, while the edge of the tubular body $d$ rises a little above that of $e$. The zones nearest the middle are each subdivided into semispaces at their lower portion by concentric partition-tubes $f$ and $g$ of about equal lengths and of which the smaller or inner one communicates with a draw-off siphon-pipe $h$, opening through the bottom $b$. The upper ends of the said tubes $f$ and $g$ are fitted with perforated external flanges $l$. In the space between the walls of $a$ and $d$ and at about midway height of the outer vessel is placed a circular pipe $k$, having a plurality of perforations in its upper crown and an upwardly-extending supply-pipe $i$.

The middle tube $c$ contains a looped and twisted steam-coil $m$, formed of a straight central portion with the other portion coiled around the same. At its upper end the tube $c$ is fitted with a slidable sleeve $n$, which carries several inwardly-declining short pipes $o$ near its top edge, and the lower end of the said tube is provided with a delivery-tap $p$.

The apparatus operates in the following manner: The water containing oil or grease enters through the supply-pipe $i$ into the circular pipe $k$, from which it issues through the perforations thereof in the form of little streamlets and then runs to the lower end of the outer zone, thence through the openings in the tube $d$, and so runs upward and downward, by reason of the partitions $f$ and $g$, into the inner zone or space between the tubes $g$ and $c$. From here the water escapes through the pipe $h$, whose upper bend is situated at practically the same level as the top edge of the tubular body $e$. The formation of the pipe $h$ is such as to cause the water to fill the vessel to the level of the upper bend of said pipe before it can escape. It is therefore clear that the little sprays issuing from the perforated supply-pipe $k$ are subjected to friction in making their way through the body of the water in the vessel $a$, and so cause the largest portion of the oil admixed in the water to seek its way upward by reason of its lesser density. During the up and down flow of the water through the various compartments of the apparatus any adhering traces or small quantities of oil or grease are driven off to the surface of the water, which latter does not rise above the surface of $d$. The oil accumulates on the surface of the water and gradually rises to the level of the small pipes $o$, through which it drips onto the steam-heated coil $m$. The action of the steam-coil is to evaporate any traces of water carried along with the oil. The sleeve $n$ enables the pipes $o$ to be lifted or lowered, according to variations in the level of the water for different flows. The pure oil collects in the lower portion of the tube $c$ and can then be drawn off through the tap $p$.

Having described my invention, what I claim as new, and desire to secure by Letters Patent of the United States, is—

1. In an apparatus for separating oil from fluids and depriving it of every trace of water in the same operation, an outer vessel, a fluid-supply pipe with perforated lateral ring portion within said vessel, concentric internal divisions and overflow-partitions leading the waste fluid toward the middle of the apparatus, a draw-off pipe for the waste fluid, a central tube for collecting the pure oil, means for delivering the oil in small quantities from the upper part of the vessel into said collecting-tube, and means within said collecting-tube for evaporating the last traces of water from the oil, substantially as stated.

2. In the apparatus of the character described, an upright cylindrical outer vessel, a perforated ring-shaped supply-pipe in the interior of said vessel, a concentric division perforated at its lower end and reaching nearly to the upper end of said vessel, a half-way overflow-partition with perforated top flange within said division, a concentric division within the first division and perforated at its lower end, an overflow-partition with perforated top flange and slightly lower than the previous partition, a draw-off pipe leading from the bottom of the vessel and externally up to the level of said divisions, a central oil-collecting tube, adjustable means on said tube for delivering small quantities of oil from the upper part of the vessel into said tube, and a steam-coil within said collecting-tube, substantially as and for the purpose stated.

3. In the apparatus of the character described, the outer vessel, the ring-shaped supply-pipe, concentric divisions and partitions, the draw-off pipe determining the level of the liquid within the apparatus, the central collecting-tube with looped steam-coil extending from the top of the apparatus down to the bottom of the said tube, and a delivery-pipe, substantially as shown and described.

In testimony whereof I have signed my name to this specification in the presence of two subscribing witnesses.

EDUARD FRIESDORF.

Witnesses:
CARL SCHMITT,
W. FRHRR VON LYNEKER.